H. L. BROWN.
Horse Rake.
No. 84,085.
Patented Nov. 17, 1868.
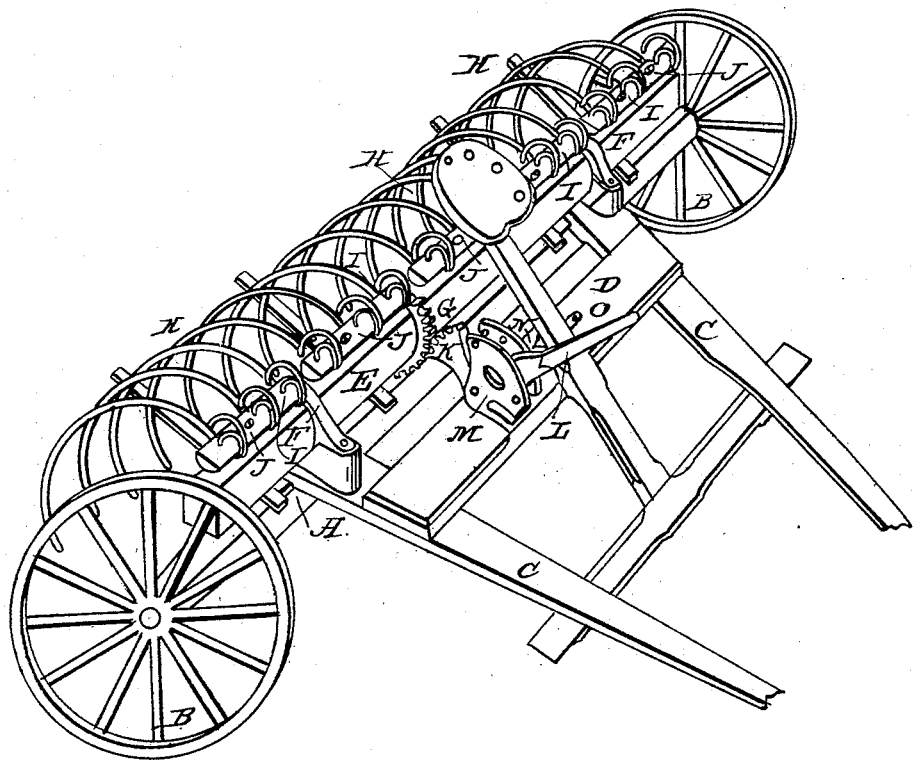

UNITED STATES PATENT OFFICE.

HENRY L. BROWN, OF ADRIAN, MICHIGAN.

IMPROVEMENT IN HORSE-RAKES.

Specification forming part of Letters Patent No. 84,085, dated November 17, 1868.

*To all whom it may concern:*

Be it known that I, HENRY L. BROWN, of Adrian, in the county of Lenawee and State of Michigan, have invented a new and useful Improvement in Horse-Rakes; and I do declare that the following is a true and accurate description thereof, reference being had to the accompanying drawings, and to the letters of reference marked thereon, and being a part of this specification.

The nature of my invention consists in constructing a horse-rake in such a manner that the spring-teeth are balanced by the weight of their coils, and of the oscillating bar to which they are attached, when elevated to drop the hay gathered, relieving the operator from much severe labor in lifting the spring-teeth, as in other machines; also, in an improved method of operating the oscillating bar, to which the springs are attached; also, in providing an automatic stop for the purpose of holding down the spring-teeth to the ground when the machine is in operation, giving the operator the free use of his hands to drive.

A is the axle of an ordinary horse-rake, provided with the wheels B and shafts C. D is a cross-bar, secured to the shafts C in front of the axle. E is an oscillating bar, working easily in the boxes F, and provided at the proper point with the segmental gear G, which is rigidly secured to the same. H are the curved spring-teeth, secured to the oscillating bar E, and held in position by the slotted bars I and screws J. K is a segmental gear, meshing in and operating the segmental gear G and the oscillating bar E, elevating or depressing the spring-teeth, as may be required, by means of the bell-crank lever L, working in the quadrant M, secured in the desired position by the automatic stop N, operated by the spring O.

When the rake is filled with hay and the operator wishes to dump the same, he presses with his foot on the stop N, disengaging it from the lever L, which he draws back with his hand, raising the spring-teeth from the ground, when the hay drops out, the weight of the coils of the spring-teeth and of the slotted bars I, in the front of the oscillating bar E, balancing the weight of that portion of the spring-teeth in the rear of the oscillating bar.

What I claim as my invention, and desire to secure by Letters Patent, is—

The segmental gears G and K, lever L, quadrant M, stop N, and spring O, substantially as herein described, and for the purposes specified.

HENRY L. BROWN.

Witnesses:
   H. F. EBERTS,
   GEO. S. CLAY.